RALPH D. LYNN INVENTOR.

BY
AGENT

RALPH D. LYNN INVENTOR.

BY Gary C Honeycutt
AGENT

RALPH D. LYNN INVENTOR.

United States Patent Office 3,209,319
Patented Sept. 28, 1965

3,209,319
MECHANICAL SPREAD CORRECTOR WITH
VARIABLE VELOCITY FUNCTION
Ralph D. Lynn, Tulsa, Okla., assignor, by mesne assignments, to Esso Production Research Company, Houston, Tex., a corporation of Delaware
Filed Sept. 15, 1961, Ser. No. 138,351
2 Claims. (Cl. 340—15.5)

This invention is concerned with the correction of seismic records. More particularly, the invention is concerned with the preparation of a corrected seismogram from uncorrected field records in which the corrections to the individual traces are entered automatically. The invention is especially adapted for use in conjunction with apparatus for the preparation of a seismic section, preferably visual in character, from one or more reproducible seismograms. A mechanical device is provided which automatically incorporates a spread correction, with a variable velocity function, into a seismogram record as it is reproduced.

Geophysical prospecting procedures using artificially induced seismic disturbances have found wide application in the search for petroleum and other mineral deposits. In all of these methods it is general practice to initiate an explosion or other seismic disturbance at a point near the surface of the earth and to direct seismic waves downward into the earth and from that point. The waves continue to travel downward within the earth until they encounter discontinuities in the earth's structure in the form of various substrata formations and the like. The discontinuities have the effect of reflecting at least a portion of seismic waves back toward the surface of the earth. By arranging a plurality of geophones or seismic transducers at spaced distances from the seismic distrubance points it is possible to detect the arrival of a reflected seismic wave at the surface of the earth. Furthermore, by using accurate timing devices and recording means it is possible to determine not only the magnitude of signals received by the various geophones but also to measure the times required for the seismic wave to travel from the disturbance point down to the various discontinuities and thence to the geophones. By knowing this information and by measuring the distances by the various geophones from the seismic disturbance point, and by further measuring or assuming velocities of seismic waves in a particular section of the earth under study, it is possible to calculate and determine the depth of the various discontinuities beneath the surface of the earth.

In ascertaining the depth of subterranean strata or other seismic reflection events it is necessary to make two general classes of corrections in the original seismic band. First it is necessary to make certain static corrections with a fixed quantity for each seismic signal detected and recorded by a given geophone or transducer location. Corrections in this category compensate for such things as the height of a geophone relative to an assumed datum plane, the velocity of the seismic waves through a low velocity layer immediately adjacent the earth, the elevation of the disturbance or shot points relative to the datum plane, and so forth.

A second type of correction that must be made to the seismic records is the so-called dynamic or variable type in that the magnitude of the correction varies with time for the signals that are received by any given geophone or transducer location. This category of correction includes the spread correction which is a function of the distance of a geophone location from a shot point. It is with this dynamic correction that this invention is primarily concerned. It is particularly concerned with the incorporation of a variable velocity function into the dynamic spread correction. The need for a variable velocity function in the spread correction arises from the fact that seismic velocity varies with the depth in the section of the earth under study.

Recently, seismic recorders of a reproducible type have been developed. These recorders are finding ever increasing application at the present time. Magnetic tape recorders are the most commonly used reproducible seismic recorders. These recorders derive their name from the fact that they receive electrical signals from geophone locations and transform these signals into variable intensity traces which are reproducible in character. Thus the recorders may be of a photographic type in that they form traces of variable density or variable area characteristics. Alternatively they may develop variable intensity magnetic traces on a magnetic medium such as wire or tape. In general all reproducible recorders and tracers are characterized in that trace information may be scanned by suitable transducers to generate a train of electrical signals in response to the trace information on a reproducible recording medium.

The equipment that is used to prepare seismic sections from a reproducible seismic record is properly referred to as "play-back" or "office play-back" equipment in that it plays back the information on the original record to generate the resulting seismic section. During play-back, both static and dynamic corrections for each signal trace are incorporated so that the section may be partially or completely corrected when completed.

A more detailed understanding of the invention will be apparent from a study of the attached drawings which illustrate the details of the apparatus.

Figure 1:
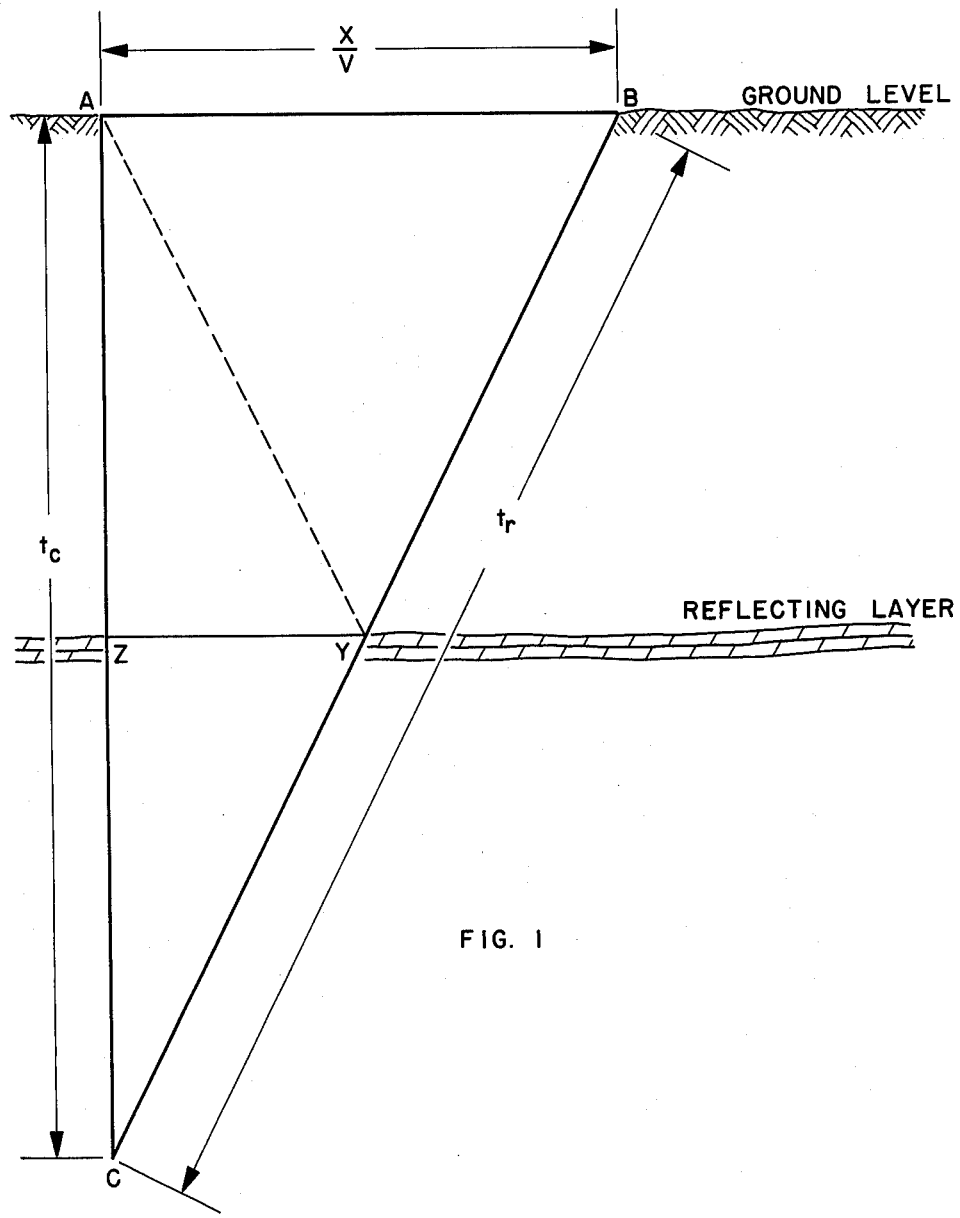
FIGURE 1 is intended to represent a vertical cross section of earth taken along a selected profile showing the geometry involved in making spread corrections.

Referring now to FIGURE 1, it is assumed that line AB represents a portion of the surface of the earth with an explosive shot placed near the surface at point B and a geophone or other transducer at point A. Seismic energy travels from the shot to the geophone as a reflected wave from a subsurface layer YZ. The time of travel from the instant of detonation of the shot to the time the reflection from the subsurface arrives at point A is equal to the distance BYA divided by the average velocity of the wave. The actual distance to be determined is the vertical depth of the reflecting layer beneath point A. If a perpendicular line is drawn from point A to the reflecting layer and the triangle AYZ is folded over along line YZ, large triangle ABC is obtained in which the distances concerned are more conveniently presented. Thus the distance BC is the same as the distance BYA and the distance AC is twice the depth to be determined.

In triangle ABC, BC represents the distance which a seismic wave must travel in traversing the path BYA. This distance is proportional to the recorded time (interval) and is thus represented by $t_r$. AC is proportional to the time which would be required for a seismic wave to travel vertically from the point A to the subsurface layer and back again vertically to the point A and thus the distance is represented by $t_c$ which is the corrected time. Thus it is desired to observe the value $t_r$ and subtract therefrom a correction value which will result in the corrected time $t_c$. The correction required to reflect this change is called the spread correction, and is represented by $\Delta t$.

Figure 2:
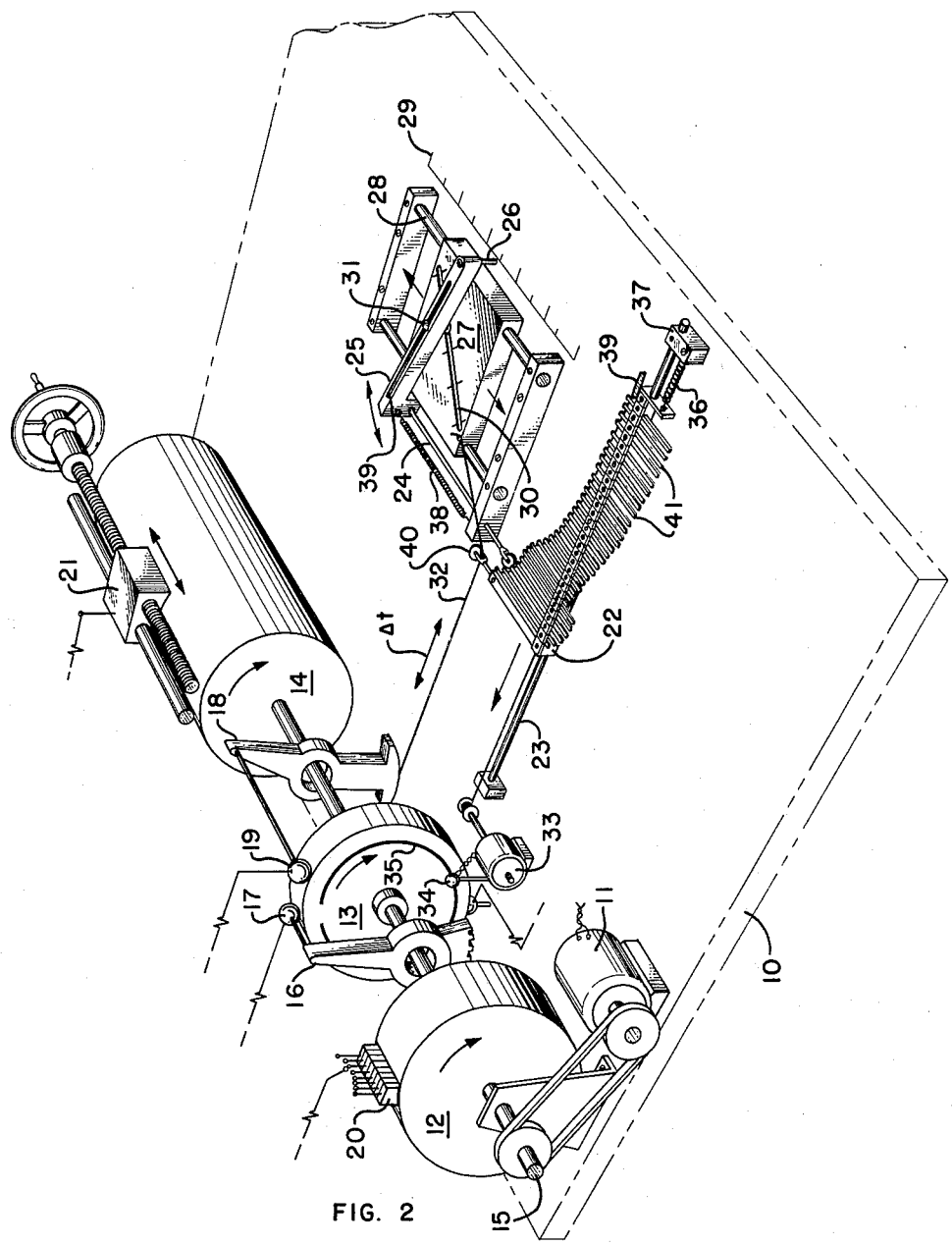
FIGURE 2 shows in detail the elements of the device of the invention and one suggested way of incorporating the spread correction automatically into the play-back equipment.

Referring now to FIGURE 2 the apparatus illustrated includes base plate 10 which is shown in outline form, a drive motor 11, record drum 12, correction drum 13, section drum 14, shaft 15, static correction arm 16, including the recording head 17, dynamic correction arm 18, including a pickup head 19, play-back heads 20 and section recording means 21. This assembly of elements taken in combination with other elements not shown constitutes a seismic section printer or play-back equipment as mentioned earlier. A disclosure of this apparatus in complete detail, including the operation thereof, can be found in U.S. Patent 2,876,428 to J. D. Skelton et al.

An exhaustive consideration of the details of the seismic section printer is obivously unnecessary for a complete disclosure of the present invention. However, a brief description of the essential features of its operation will be described to facilitate an understanding of the spread corrector of this invention. The basic function of the specific play-back apparatus shown is to convert uncorrected seismic records of the reproducible magnetic type into a corrected visual seismic sections of the variable density type. The uncorrected records are mounted on record drum 12. The seismic data contained in these records is scanned one trace at a time by play-back head 20 and transferred to recording head 17 on correction drum 13. The magnetic signals are in turn transferred to pickup head 19 and thence to section drum 14 where the magnetic impulses are converted into a variable density linear light beam which forms a line image on photographic film mounted on the section drum. This operation is then repeated for each successive trace until an entire group of traces is reproduced side-by-side upon the section drum.

The various static and dynamic corrections are introduced into the visual record by adjustments in the distance between recording head 17 and pickup head 19 on the correction drum. These adjustments are made through static correction arm 16 and dynamic correction arm 18. The position of static correction arm 16 is preset before beginning the transfer of each seismic trace. The details which govern its positioning form no part of the present invention and therefore will not be further described. The motion of dynamic correction arm 19 is variable during the time of recording each trace and its precise motion is controlled by the spread correction mechanism of this invention.

The elements of the spread correction mechanism include velocity cam assembly 22 which moves along slide 23, cam follower 24, bar 25, pivot member 26, plate 27, slide 28, scale 29, diagonal slot 30, connecting member 31 and cable 32.

In operation at the beginning of transfer of each seismic trace, cam assembly 22 is actuated by motor 33 which is synchronized with the play-back equipment, for example, through power take-off 34, riding on brass ring 35. The electric power which energizes motor 33 is supplied through brass ring 35 such that at the end of each revolution of the play-back assembly apparatus, the motor 33 will be temporarily disconnected from power as the take-off 34 reaches the open space in ring 35. At this point, spring 36 returns the cam assembly to its initial position resting against block 37. Thus the speed of motor 33 must be such that it moves the cam assembly from its rest position to the end of slide 23 near the motor during one revolution of the play-back assembly drums. Synchronization with the play-back equipment may be accomplished by any suitable means alternative to that shown.

Cam follower 24 is restrained throughout the operation to a position parallel with slide 28. Spring 38 holds bar 25 against the opposite end of cam follower 24 such that motion induced by the irregular shape of cam surface 39 is translated to bar 25. The motion of bar 25 about fixed pivot 26 causes plate 27 to slide back and forth along slide 28. Connecting member 31 is free to move in slot 39 along bar 25, but is fixed along slot 30 in plate 27. The point at which member 31 is fixed along slot 30 is determined by the geophone distance from the shot point corresponding to the trace on drum 12 being transferred to the seismic section on drum 14. That is, the distance along scale 29 from a point even with that at which member 31 is fixed on slot 30, to that edge of plate 27 which is farthest from the cam assembly, is proportional to the geophone distance from the shot point, which corresponds to the X value of FIGURE 1. A linear scale proportional to values of X may also be placed along slot 30, or along the other dimension of plate 27.

Since cable 32 is anchored to plate 27 and is also held by sheave 40 of cam assembly 22, the simultaneous motion of the cam assembly and of plate 27 determines the motion of the cable which in turn controls the position of correction arm 18. The longitudinal displacement of cable 32 along the path between roller 40 and correction arm 18 is proportional to $\Delta t$, the spread correction.

The arms 41 of cam assembly 22 are adjustable such that they determine the exact shape of cam surface 39. The setting of arms 41 is determined from known or assumed velocity information corresponding to the area of the earth from which the seismic data are obtained. Thus the arms 41 which lie adjacent cam follower 24 in the embodiment shown correspond to a level of the earth near the surface, whereas those arms nearest block 37 correspond to the deepest horizons below the earth from which the seismic records are obtained. The "base line" which corresponds to infinite velocity ($1/V=0$) does not appear in the drawing, since actual operation is concerned only with a practical range of velocities. It is important conceptually, however, as discussed below. At any rate, since the velocity function represented by cam surface 39 is inverse, each adjustable arm of the assembly is set such that its corresponding segment of surface 39 is fixed, relative to the base line, at a distance proportional to unity divided by the average velocity of a seismic wave in vertically traversing the earth from its surface to the depth represented by the arm.

Figure 3:
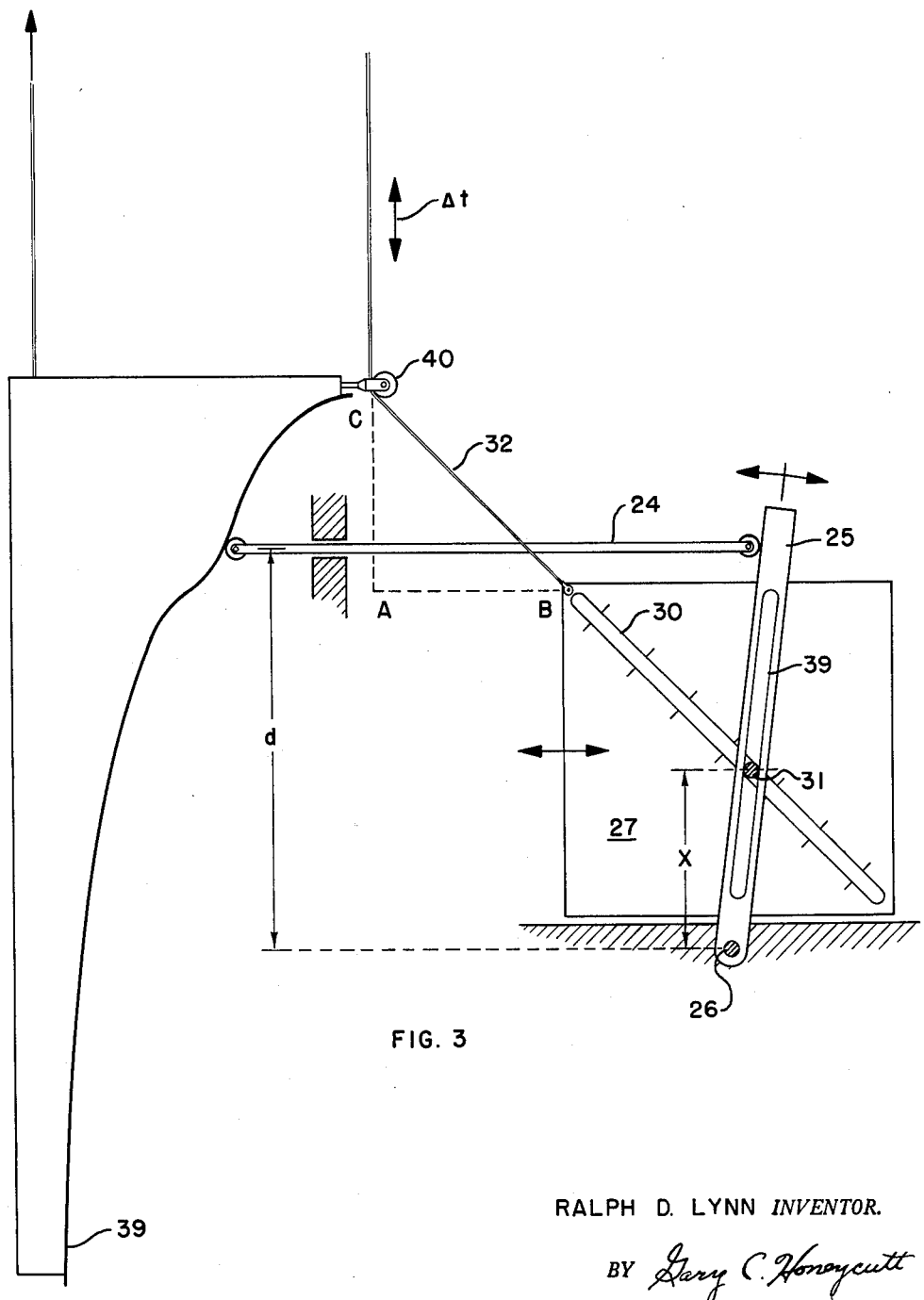
FIGURE 3 is a top view of the spread corrector, showing a mechanical analogy with the geometry of FIGURE 1.

Referring now to FIGURE 3 the sides of triangle ABC are again proportional to the same values as the corresponding sides of the triangle ABC in FIGURE 1. While the mechanism of FIGURE 3 is in motion it will be apparent that the lengths of the sides of the triangle ABC are continuously changing during its normal operation. The side BC is always prooprtional to $t_r$ and the side AC is always proportional to $t_c$, only if side AB is made to vary such that at all times it is proportional to the product of X, the geophone distance and $1/V$, the velocity function represented by cam surface 39.

This relationship is demonstrated by first noting the positions of the various elements of the device which correspond to a value of zero for X; and then to a value of zero for $1/V$. If either X or $1/V$ becomes zero, then their product is zero. A product of zero is indicated in the apparatus by a position of plate 27 such that cable 32 lies in a single straight line, or in other words, such that point B coincides with point A. A setting of X equal to zero would require that member 31 be made to coincide with member 26. Although it is not physically possible in the embodiment shown, such a setting would render plate 27 independent of $1/V$, that is, the motion of cam follower 24 would no longer affect the position of plate 27. This is in accord with the desired mathematical relationship.

Conversely, a setting of $1/V$ equal to zero requires the rotation of bar 25 far to the left, with a consequent displacement of plate 27 to the left, such that slot 39 is superimposed over slot 30. This setting brings point B in coincidence with point A, and renders plate 27 independent of X, that is, adjustment of member 31 along slot 30 no longer affects the position of plate 27.

Consider now an initial setting corresponding to $1/V=0$, with member 31 fixed along slot 30 at some positive X value. Then let bar 25 rotate clockwise to a position representing some positive value of $1/V$. The initial and final positions of bar 25 form sides of similar triangles having a common vertex at pivot 26. The path traversed by connecting member 31 forms the base of the smaller triangle, while the path traveresd by that variable point along bar 25 which lies in the path of follower 24 traces out the base of the larger triangle. It is a characteristic of similar triangles so located that the base of the smaller is equal to the product of the base of the larger and the ratio of their altitudes. Thus, the displacement of member 31 equals the product of the displacement of cam follower 24 and the ratio $X/d$. Since the motion of member 31 equals the distance AB, and the motion of follower 24 is arbitrarily determined to be $1/V$ by the shape of surface 39, we have:

$$AB=(1/V)(X/d)$$

Since $1/d$ is a constant, then AB is proportional to $X/V$.

Since the distance AB is proportional to $X/V$ for all values of V during the operation, it then becomes clear that the distance AC is proportional to the corrected time and the distance BC is proportional to the recorded time. Also, the longitudinal displacement of cable 32 is equal to the difference between AC and BC. This difference is $\Delta t$, the spread correction which is introduced to the spread correction arm 18 of FIGURE 2.

The invention is not limited to the embodiment shown. For example, cam follower 24 may engage bar 25 at any convenient location along the bar, except of course the engagement may not be at pivot 26. As a practical matter, the engagement should be a substantial distance from the pivot to ensure smooth operation.

In one embodiment, pivot 26 is located near the center of bar 25, cam follower 24 engages one arm of the bar, and member 31 engages slot 39 in the opposite arm.

Bar 25 is any rigid member adapted to engage cam follower 24 in a manner such that the follower is not diverted from its linear path, and adapted to engage member 31 along a linear path aligned with pivot 26.

Plate 27 is any rigid member restrained to a path parallel with that of follower 24, and adapted to engage member 31 adjustably along a linear path inclined with respect to the path of follower 24. Point B, at which line 32 is anchored, is located such that it coincides with point A when slot 30 is aligned with pivot 26.

Cable 32 is any string, cord, wire or the like having a suitable strength and flexibility.

Sheave 40 is any guide means for confining cable 32 to its prescribed path. Although the guide means shown is attached to cam assembly 22, it need not necessarily be so attached; but since it must move in unison with the cam assembly, no alternative arrangement is deemed practical.

What is claimed is:
1. Mechanical analog apparatus for calculating a spread correction for use in the preparation of a corrected seismic section prepared from a plurality of seismic traces which comprises a base plate, a velocity cam movably mounted thereon, means for moving said cam in a first linear path along said plate, a cam follower engaging said cam, means for restraining said follower such that its motion defines a second linear path perpendicular to said first linear path, an elongated rigid member pivotally mounted on said base plate and engaging said cam follower at a point removed from said pivot, a second rigid member restrained to move in a third linear path parallel to said second linear path and engaging said first rigid member at a point removed from said pivot, the latter engagement being adjustable to various fixed positions along a fourth linear path on said second rigid member, each fixed position corresponding to an individual seismic trace of said seismic section, and freely movable along a fifth linear path on said first rigid member, said fifth linear path being in alignment with said pivot, said fourth linear path being inclined with respect to said third linear path, guide means directly connected to said cam and moving in the same path with said cam, and a string attached to said second rigid member and extending in contact with said guide means.

2. Apparatus as defined by claim 1, wherein the surface of said cam is adjustable.

References Cited by the Examiner
UNITED STATES PATENTS

| | | | |
|---|---|---|---|
| 1,131,953 | 3/15 | Pilkington | 74—568 X |
| 2,898,574 | 8/59 | Palmer | 340—15.5 |

SAMUEL FEINBERG, *Primary Examiner.*

BENJAMIN A. BORCHELT, CHESTER L. JUSTUS,
*Examiners.*